Oct. 18, 1966  R. HENRY  3,279,817
PIVOTALLY SUPPORTED SAFETY DEVICE
Filed June 30, 1964  2 Sheets-Sheet 2
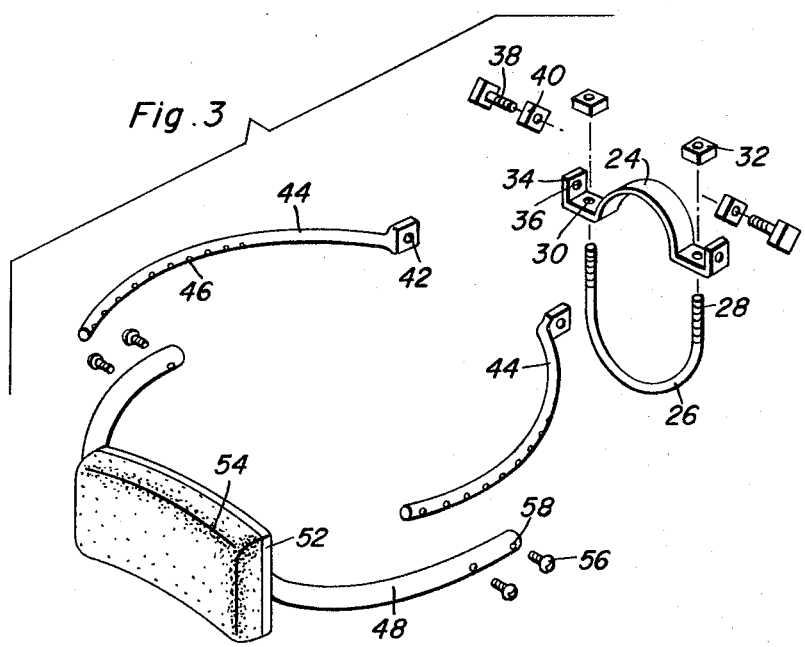
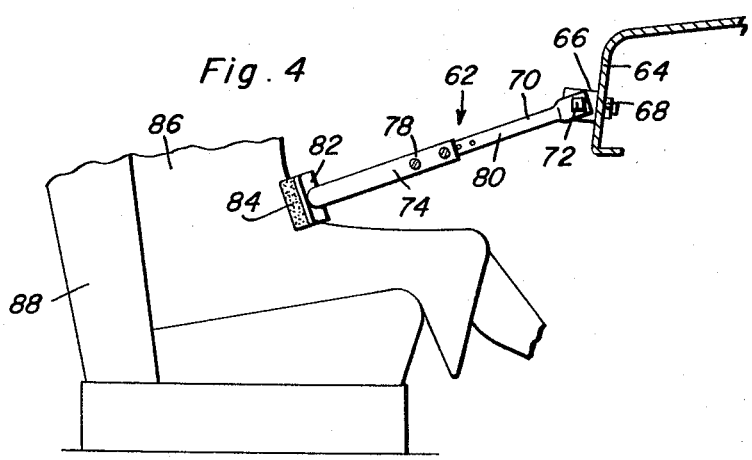
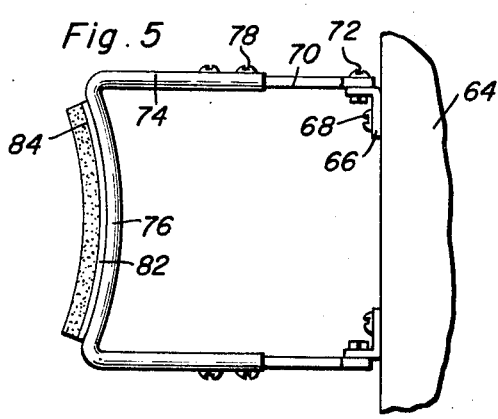
Reece Henry
INVENTOR.

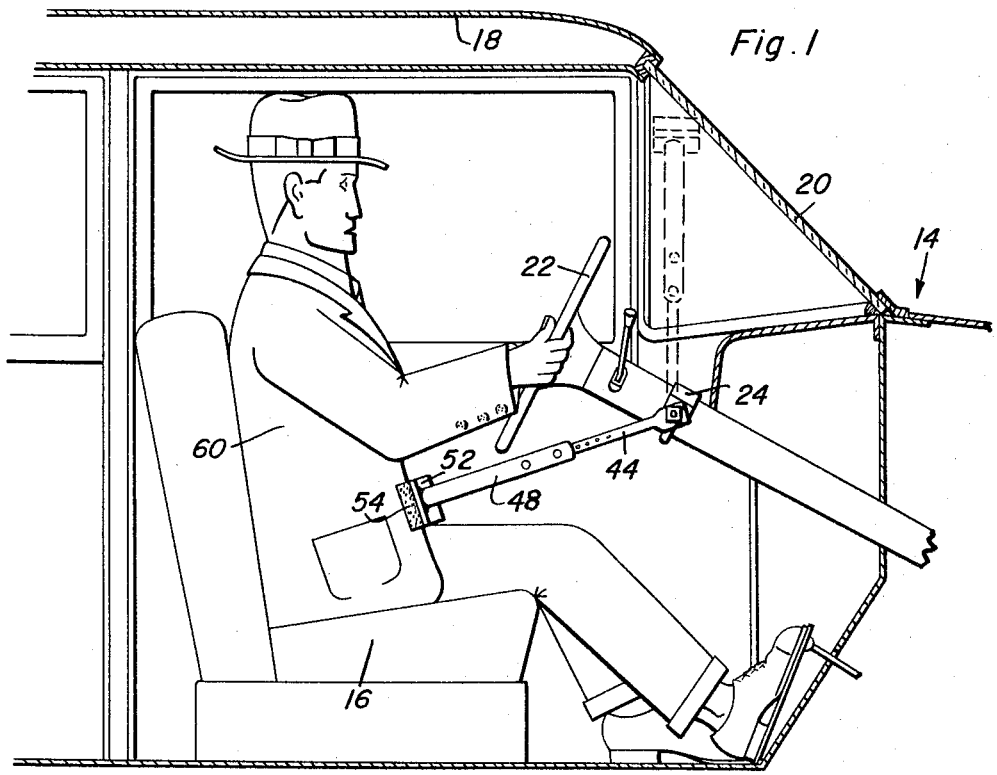
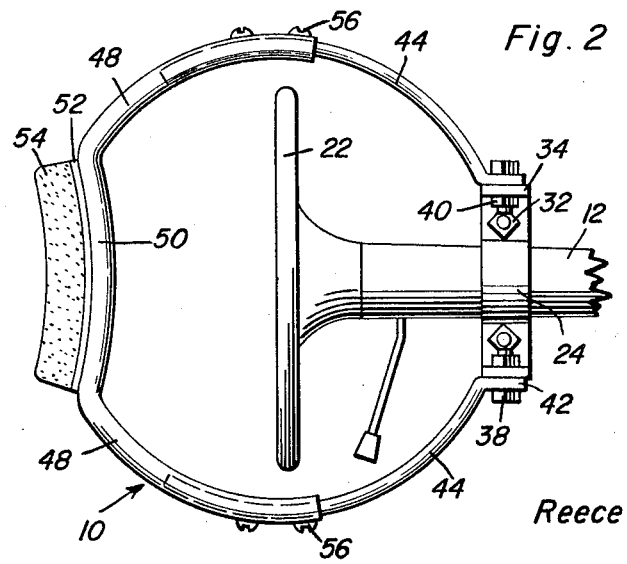

United States Patent Office 3,279,817
Patented Oct. 18, 1966

3,279,817
PIVOTALLY SUPPORTED SAFETY DEVICE
Reece Henry, Lincolnton, N.C.; Eliza Fullwood Henry, administratrix of said Reece Henry, deceased, assignor to Eliza F. Henry, Lincolnton, N.C.
Filed June 30, 1964, Ser. No. 379,263
5 Claims. (Cl. 280—150)

The present invention generally relates to a safety device for use in an automotive vehicle such as a passenger car or the like in which the safety device is in the form of a resilient cushion or barrier that is pivotally supported from the vehicle for positioning in front of the waist area of a person or persons occupying the vehicle in order to prevent such persons from moving toward the front of the vehicle such as normally occurs in the event of sudden deceleration of the vehicle such as when the vehicle is involved in an accident.

An object of the present invention is to provide a safety device that is pivotally supported from a convenient support on a vehicle so that the resilient cushion forming a part of the safety device may be orientated in an operative position immediately in front of the waist region of an occupant of the vehicle to a position in which the safety device is inoperative with the cushion pivoted to a vertically orientated position so that the occupant of the vehicle may have freedom of movement during periods when the vehicle is not being operated or when the occupants are getting into or leaving the vehicle.

Another important object of the present invention is to provide a safety device which is adjustable to adapt it for use with various types of vehicles and various sides of occupants.

Still another feature of the present invention is to provide a safety device which is adapted to be mounted on the steering column of a vehicle with the supporting arms for a resilient cushion being of sufficient magnitude to enable the supporting arms to pivot from a position under the steering wheel to a position above the steering wheel when moving the safety device from an operative to an inoperative position.

Still another feature of the present invention is to provide a safety device which is adapted to be mounted on the dashboard of a vehicle such as on either side of the glove compartment normally provided therein thereby enabling installation of the safety device for either the driver of the vehicle or a passenger in the front seat with the device also being capable of being mounted in the rear of a passenger type vehicle for protection of rear seat passengers.

Yet another important feature of the present invention is to provide a safety device for a vehicle which is simple in construction, easy to install, efficient in its operation, capable of being constructed of various rigid and strong material such as fiberglass and the like and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a safety device incorporating the principles of the present invention therein illustrating the device installed on the steering column or post of an automotive vehicle with the dotted line position illustrating the inoperative position of the safety device;

FIGURE 2 is a top plan view of the construction of FIGURE 1 illustrating the orientation of the safety device in relation to the steering column and the steering wheel at the upper end thereof;

FIGURE 3 is an exploded group perspective view of the components of the safety device of the present invention;

FIGURE 4 is a side elevational view illustrating a modified form of safety device mounted on the dashboard of the vehicle; and FIGURE 5 is a top plan view of the construction of FIGURE 4 illustrating the structural features thereof.

Referring now specifically to the drawings, the numeral 10 generally designates the safety device of the present invention which is pivotally supported from the steering column or post 12 of an automotive vehicle 14 having the usual seat 16, roof 18, windshield 20, steering wheel 22 and all other structural features normally incorporated into a passenger automobile.

As illustrated, the safety device of the present invention includes a generally U-shaped strap or bracket 24 engaging over the top surface of the steering column or post 12 and the strap or bracket 24 is associated with a U-bolt 26 having threaded legs 28 extending through apertures 30 in the bracket 24 for receiving threaded nuts 32 thereon whereby the bracket 24 is rigidly but detachably clamped to the steering column or post 12. It is pointed out that the specific dimensional relationship of the components of the mounting bracket may vary depending upon the size and construction of the steering post on the vehicle.

The outer ends of the strap 24 are upturned as at 34 and provided with apertures 36 for receiving pivot bolts 38 having retaining nuts 40 on the inner ends thereof. The pivot bolts 38 extend through apertured ears 42 provided on the ends of arcuate arms 44 having a plurality of spaced apertures 46 extending therethrough.

The arcuate arms 44 are telescopically received in arcuate tubular members 48 which are continuous with each other and provided with a central concave tubular member 50 which receives and supports an arcuate plate 52 on the outer surface thereof having a cushioning pad 54 secured thereto in any suitable manner such as by bonding or the like. The plate 52 has considerably more vertical dimensions than the concave tubular member 50 and extends both above and below the tubular member 50 and the pad 54 may be of any suitable material such as foam rubber, foam plastic or the like and to prevent disintegration of the cushioning material, it may be covered with a suitable covering material such as plastic or the like for providing a comfortable device which is neat in appearance.

For securing the arcuate arms 44 and the arcuate tubular members 48, there is provided a pair of screwthreaded fasteners 56 extending through aperatures 58 provided therefor and also extending one of the aperatures 46 thereby enabling arcuate adjustment of the members 44 in relation to the tubular members 48 thus enabling the characteristics of the generally circular safety device as illustrated in FIGURE 2 to be varied with the necessary inward and outward movement of the ears 42 being accommodated by providing different sizes of mounting straps or spaces therefor.

As illustrated in FIGURE 1, the safety device is in operative position when it is disposed generally horizontally and is disposed in immediate ajacient relation to the forward surface of the waist region of an occupant 60 with the cushion 54 being disposed generally above or in alignment with the hips with the cushion 54 generally laying in the lap of the occupant 60 to prevent forward movement of the occupant 60 in relation to the vehicle 14. When the occupant 60 desires to egress from the automobile or get into the automobile, the safety device is pivoted upwardly over the steering wheel 22 into substantially a vertical position as illustrated in dotted line in FIGURE 1. By varying the initial positioning of the safety device and by adjusting the size characteristics thereof, the cushion may be accurately positioned so that it is closely adjacent the occupant so that the occupant cannot be moved forwardly by forces of inertia in the event of sudden deceleration of the vehicle such as ocurs when striking an obstruction with the vehicle. This will prevent injury due to the occupant landing against the dashboard or onto or through the windshield which is the cause of many serious injuries of vehicle occupants.

While the device has been illustrated as being constructed of metal components, it is pointed out that the components thereof may also be of any suitable rigid material having sufficient strength characteristics such as glass fiber reinforced plastic material which may be constructed of any suitable decorative colors compatible with the interior decor of the vehicle. Also, as illustrated, the contour of the cushion is generally concave to fit and conform with the surface of the body of the occupant normally engaged thereby, thereby providing a very comfortable device and one which will efficiently engage the occupant and retain him in position in relation to the vehicle.

FIGURES 4 and 5 illustrate a modified form of the invention generally designated by numeral 62 which is mounted on the dashboard 64 of an automotive vehicle and includes a pair of L-shaped brackets 66 secured in place by suitable fasteners 68. The bracket 66 may be orientated on opposite sides of the glove compartment to provide a supporting attachment for the safety device but which does not interfere with normal operation of the glove compartment.

A pair of pivotal arms or support members 70 are attached to the brackets 66 by pivot bolts 72 and the outer ends of the arms 70 are telescopically received within tubular members 74 which are interconnected by a concavely arcuate tubular member 76 whereby the tubular member 76 and the tubular member 74 serve to form substantially a U-shaped member telescopically receiving the arms 70 and being adjustable in relation thereto by using a pair of fasteners 78 engaging one of the plurality of apertures 80 formed in the arm 70 thereby adjusting the effective fore and aft dimension of the safety device 62.

Mounted on the arcuate tubular member 76 is an arcuate plate 82 having a pad of cushioning material 84 thereon which is also arcuate and provided with a concave surface facing the occupant 86 of the vehicle seat 88 for preventing such an occupant from moving forwardly in relation to the vehicle in the event of sudden deceleration of the vehicle. Here again, the safety device is pivotally supported so that it can be swung vertically to an out-of-the-way vertical position and the fact that the cushioning device can generally lay in the lap of the occupant will enable the device of the present invention to be employed with very little discomfort and generally will be unnoticed by the person using the device.

In both forms of the invention, the vehicle occupants will be prevented from moving forwardly in the vehicle and even if some movement of the safety device occurs during deceleration, such movement will still prevent forward movement of the occupant in relation to the vehicle. Both forms of the invention may be constructed of fiberglass material or other equivalent materials and while the device has been illustrated and used in the front seat of the vehicle, it is pointed out that it may also be mounted in the rear seat of the vehicle, by being mounted on the rear surface of the front seat of a vehicle or by being mounted on a transverse strap attached to said back of the front seat for stabilizing the safety device.

The present invention is entirely different from conventional safety belts and serves to hold the driver or passenger in an automobile in case of collision or a wreck inasmuch as the device holds the driver or the passenger firmly in his seat and prevents his falling forward on the steering wheel or through the windshield. The safety device may be made a permanent part of the motor vehicle and it is easy to adjust for orientating the pad in proper position. When the safety device is in the inoperative position, the person entering the vehicle will pull the safety device down so that it is disposed in front of the body immediately above the hips so that the device will engage the abdomen comfortably. So far as the operator of the vehicle is concerned, it will be substantially impossible for him to operate the vehicle unless the safety device is pulled down from its stationary position over the steering wheel inasmuch as the safety device partly interferes with the line of vision of the operator when it is in inoperative position. The strap or arm 24 can be adjusted up or down the steering column to provide flexibility in the position of the device which coupled with the normal adjustment of the driver's seat will provide sufficient flexibility of installation. Also, various types of latch mechanisms may be employed in lieu of the various lock screws.

The foregoing is considered as illustrative only of the principles of the invention. Further, since numerous modifications and changes will readily ocur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A safety device for vehicles comprising a pair of arms, bracket means pivotally supporting said arms, said bracket means adapted to be connected to a vehicle, said arms supporting an arcuate plate adapted to be positioned immediately forwardly of the abdomen region of an occupant of a vehicle to prevent forward movement of the occupant in relation to the vehicle, cushioning material on said arcuate plate for cushioning engagement with the occupant of the vehicle, said bracket means including an arcuate strap adapted to engage the top surface of a steering column of a vehicle, a U-bolt securing the strap to the steering column and enabling adjustment of the bracket in relation to the steering column, said strap including offset ears at the ends thereof, and means pivotally securing the arms to said ears.

2. The structure as defined in claim 1 wherein said arms are arcuate in configuration so that the arms and plate may be pivoted upwardly in relation to the steering column or straddling the steering wheel at the upper end of the steering column whereby the safety device may be orientated in a vertical position above the steering wheel when in inoperative position and orientated with the cushion immediately between the steering wheel and abdomen of an occupant when the safety device is in operative position.

3. The structure as defined in claim 2 wherein said arcuate arms are adjustable in length.

4. A safety device for vehicles comprising a pair of arms, bracket means pivotally supporting said arms, said bracket means adapted to be connected to the vehicle, said arms supporting a plate adapted to be positioned immediately forwardly of the abdomen region of an occupant of a vehicle to prevent forward movement of the occupant in relation to the vehicle, said bracket means including an arcuate strap adapted to engage the top surface of a steering column on a vehicle, a U-shaped bolt securing the strap to the steering column and enabling adjustment of the bracket in relation to the steering column, said strap including offset ears at the ends thereof, and means pivotally securing the arms to said ears.

5. A safety device for vehicle comprising a pair of arms, bracket means pivotally securing said arms, said bracket means adapted to be connected to the steering column of a vehicle, said arms supporting an arcuate plate adapted to be positioned immediately forwardly of the abdomen region of an occupant of a vehicle to prevent forward movement of the occupant in relation to the vehicle, said arms supporting an arcuate plate adapted to be positioned immediately forwardly of the abdomen region of an occupant of a vehicle to prevent forward movement of the occupant in relation to the vehicle, cushioning material on said arcuate plate for cushioning engagement with the occupant of the vehicle, said arms being arcuate in configuration so that the arms and plate may be pivoted upwardly in relation to the steering column or straddling the steering wheel at the upper ends of the steering column whereby the safety device may be oriented in a vertical position above the steering wheel when in inoperative position and oriented with the cushion immediately between the steering wheel and abdomen of an occupant when the safety device is in operative position.

References Cited by the Examiner
UNITED STATES PATENTS

| | | | |
|---|---|---|---|
| 2,781,203 | 2/1957 | Kurilenko | 280—150 |
| 2,801,866 | 8/1957 | Naslund | 280—150 |
| 2,923,559 | 2/1960 | Owens | 280—150 |
| 3,105,702 | 10/1963 | Larson | 280—150 |
| 3,133,746 | 5/1964 | Zazzara | 280—150 |

BENJAMIN HERSH, *Primary Examiner.*

W. A. MARCONTELL, *Assistant Examiner.*